United States Patent
Eronen et al.

(10) Patent No.: US 10,869,153 B2
(45) Date of Patent: Dec. 15, 2020

(54) APPARATUS FOR SPATIAL AUDIO AND ASSOCIATED METHOD

(71) Applicant: Nokia Technologies Oy, Espoo (FI)

(72) Inventors: Antti Eronen, Tampere (FI); Arto Lehtiniemi, Lempäälä (FI); Jussi Leppänen, Tampere (FI); Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/463,033

(22) PCT Filed: Nov. 22, 2017

(86) PCT No.: PCT/FI2017/050805
§ 371 (c)(1),
(2) Date: May 22, 2019

(87) PCT Pub. No.: WO2018/096209
PCT Pub. Date: May 31, 2018

(65) Prior Publication Data
US 2019/0289419 A1    Sep. 19, 2019

(30) Foreign Application Priority Data
Nov. 25, 2016    (EP) ..................... 16200752

(51) Int. Cl.
*G06F 3/16* (2006.01)
*H04S 7/00* (2006.01)
(Continued)

(52) U.S. Cl.
CPC .............. *H04S 7/303* (2013.01); *G06F 3/167* (2013.01); *G06K 9/00671* (2013.01); *G06T 19/006* (2013.01)

(58) Field of Classification Search
None
See application file for complete search history.

(56) References Cited

U.S. PATENT DOCUMENTS

| 2012/0093320 A1 | 4/2012 | Flaks et al. |
| 2012/0206452 A1* | 8/2012 | Geisner ................... H04S 7/304 345/419 |

(Continued)

OTHER PUBLICATIONS

Pihlajamaki et al., "Synthesis of Spatially Extended Virtual Sources with Time-Frequency Decomposition of Mono Signals", Journal of the Audio Engineering Society, vol. 62, No. 7/8, Jul./Aug. 2014, pp. 467-484.

(Continued)

*Primary Examiner* — Yu Chen
(74) *Attorney, Agent, or Firm* — Harrington & Smith (57) ABSTRACT

An apparatus configured to, in respect of presentation, to a user, of a secondary content window (201) overlying a scene (200) such that it covers a predefined area of the scene, the secondary content window (201) providing a display area for secondary visual content thereby allowing for viewing of the secondary visual content alongside the scene outside the predefined area; based on a predetermined event occurring in the scene at a location hidden by the secondary content window; provide for presentation of audio of at least the predetermined event with an event spatial audio effect, the event spatial audio effect configured to place a perceived origin of the audio of the predetermined event at a location (301) outside the secondary content window (201) to thereby alert a user to the occurrence of the predetermined event hidden by the secondary content window.

20 Claims, 3 Drawing Sheets (51) Int. Cl.
*G06K 9/00* (2006.01)
*G06T 19/00* (2011.01)

(56) References Cited

U.S. PATENT DOCUMENTS

| | | | | |
|---|---|---|---|---|
| 2014/0178043 A1* | 6/2014 | Kritt | ................... | G06F 3/0484 |
| | | | | 386/241 |
| 2018/0109900 A1* | 4/2018 | Lyren | ...................... | H04S 7/304 |
| 2019/0253691 A1* | 8/2019 | Ostrover | .............. | H04N 13/117 |

OTHER PUBLICATIONS

Shah et al., "Metrics for Measuring Ideation Effectiveness", Design Studies, vol. 24, No. 2, Mar. 2003, pp. 111-134.
Smith., "Idea-Generation Techniques: A Formulary of Active Ingredients", Journal of creative behavior, vol. 32, No. 2, 1998, pp. 107-133.
Smith, "Towards a logic of innovation", The International Handbook on Innovation, Dec. 2003. p. 347-365.
Extended European Search Report received for corresponding European Patent Application No. 16200752.0, dated May 17, 2017, 5 pages.
International Search Report and Written Opinion received for corresponding Patent Cooperation Treaty Application No. PCT/FI2017/050805, dated Feb. 13, 2018, 12 pages.

\* cited by examiner

600 — based on a predetermined event occurring in the scene at a location hidden by the secondary content window 601 — providing for presentation of audio of at least the predetermined event with an event spatial audio effect, the event spatial audio effect configured to place a perceived origin of the audio of the predetermined event at a location outside the secondary content window to thereby alert a user to the occurrence of the predetermined event hidden by the secondary content window.

Figure 7

APPARATUS FOR SPATIAL AUDIO AND ASSOCIATED METHOD

RELATED APPLICATION

This application was originally filed as Patent Cooperation Treaty Application No. PCT/FI2017/050805 filed Nov. 22, 2017 which claims priority benefit to EP Patent Application No. 16200752.0, filed Nov. 25, 2016.

TECHNICAL FIELD

The present disclosure relates to events occurring in a scene in an area covered by secondary content. Associated methods, computer programs and apparatus is also disclosed. Certain disclosed aspects/examples relate to virtual reality devices, augmented reality devices and portable electronic devices.

BACKGROUND

A user may wish to watch different content at the same time. For example, a user may watch primary content but would want to keep track of secondary content at the same time. There may be part of the primary content that is hidden by the display of the secondary content.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
  at least one processor; and
  at least one memory including computer program code, the at least one memory and the computer program code configured to, with the at least one processor, cause the apparatus to perform at least the following:
  in respect of presentation, to a user, of a secondary content window overlying a scene such that the secondary content window covers a predefined area of the scene less than an area comprising a visual extent of the scene, the secondary content window providing a display area in which to provide for presentation of at least secondary visual content thereby allowing for viewing of the secondary visual content alongside the scene outside the predefined area;
  based on a predetermined event occurring in the scene at a location hidden by the secondary content window;
  provide for presentation of audio of at least the predetermined event with an event spatial audio effect, the event spatial audio effect configured to place a perceived origin of the audio of the predetermined event at a location outside the secondary content window to thereby alert a user to the occurrence of the predetermined event hidden by the secondary content window.

In one or more embodiments, the scene comprises one of;
a virtual reality scene based on virtual reality content for presentation to a user in virtual reality, wherein a virtual reality view presented to the user provides for viewing of at least a spatial portion of the virtual reality scene at any one time, and the secondary content window overlays the virtual reality scene at a particular location relative to the virtual reality scene; and
a real world scene and wherein presentation of the secondary content window is in augmented reality and the secondary content window overlays the real world scene at a particular location relative to the real world scene.

In one or more embodiments, the secondary visual content provided in the secondary content window has associated secondary audio content, said secondary content audio provided with a secondary spatial audio effect configured to place a perceived origin of the audio of the secondary audio content at a location within the secondary content window; and wherein
  the secondary content audio is presented instead of audio associated with the part of the scene that is hidden by the secondary content window.

In one or more embodiments, the event spatial audio effect is configured to place the perceived origin of the audio of at least the predetermined event at a location adjacent to the secondary content window.

In one or more examples, the presentation of spatial audio in this way may provide the perception that the audio of the event (whether the event is ongoing or for a time period after) is "leaking out" from beneath the secondary content window.

In one or more embodiments, the secondary content window is provided for display at a particular location relative to the scene, and wherein when the secondary content window is outside the user's current field of view of the scene, provide for presentation of the audio of at least the predetermined event with the event spatial audio effect configured to place the perceived origin at a location between an edge of the current field of view closest to the predetermined event and the predetermined event.

In one or more embodiments, the event spatial audio effect is configured to place the perceived origin at an edge of the current field of view closest to the predetermined event and, based on the user's current field of view including the secondary content window and therefore the hidden predetermined event, provide for configuration of the event spatial audio effect to place the perceived origin at a location adjacent to the secondary content window.

In one or more embodiments, the apparatus is caused to provide for presentation of the audio of at least the predetermined event for a time period temporally extending from the predetermined event to one or more of:
  a predetermined period of time thereafter;
  a time defined by a user input to stop the presentation of said audio;
  a time defined by predetermined data associated with the scene;
  a time determined by visual analysis of the scene to identify when one or more visual changes occurring in the predefined area of the scene that is hidden by the secondary content window, the one or more visual changes defining the predetermined event, have ended;
  a time determined by audio analysis of the scene to identify when one or more of an occurrence of and change in audio that has a perceived origin in the predefined area of the scene that is hidden by the secondary content window, the occurrence of/change in audio defining the predetermined event, has ended.

In one or more embodiments, based on the predetermined event occurring in the scene; the apparatus is further caused to provide for display of the secondary content with a visual effect to provide for viewing of the predefined area of the scene previously hidden by the secondary content window and secondary content.

In one or more examples, the visual effect may comprise one or more of:
i) a transparency effect so the user can see the part of the scene hidden by the secondary content window;
ii) an animated effect to intermittently remove the secondary content window from display;
iii) an animated effect to show the part of the scene hidden by the secondary content window, at least partly translated from behind the secondary content window.

In one or more embodiments, based on a user input to reveal the predetermined event, the apparatus is caused to provide for display of at least part of the predefined area of the scene hidden by the secondary content window and secondary content.

In one or more embodiments, display of the at least part of the predefined area of the scene hidden by the secondary content window and secondary visual content is provided by temporary relocation of the secondary content window to reveal said at least part of the predefined area.

In one or more examples, the apparatus provides for revealing of the predetermined event, when the user input is received within a predetermined time of the predetermined event occurring in the scene, the predetermined time comprising one or more of:
a predetermined period of time;
a time defined by predetermined data associated with the scene;
a time based on visual analysis of the scene to identify when one or more visual changes occurring in the predefined area of the scene that is hidden by the secondary content window, the one or more visual changes defining the predetermined event, have ended;
a time based on audio analysis of the scene to identify when one or more of an occurrence of and change in audio that has a perceived origin in the predefined area of the scene that is hidden by the secondary content window, the occurrence of/change in audio defining the predetermined event, has ended.

In one or more examples, the secondary content window is returned to overlay the predefined area after one or more of:
a predetermined period of time;
a time defined by predetermined data associated with the scene;
a time based on visual analysis of the scene to identify when one or more visual changes occurring in the predefined area of the scene that is hidden by the secondary content window, the one or more visual changes defining the predetermined event, have ended;
a time based on audio analysis of the scene to identify when one or more of an occurrence of and change in audio that has a perceived origin in the predefined area of the scene that is hidden by the secondary content window, the occurrence of/change in audio defining the predetermined event, has ended.

In one or more embodiments, the scene comprises a virtual reality scene based on virtual reality content for presentation to a user in virtual reality, wherein a virtual reality view presented to the user provides for viewing of at least a spatial portion of the virtual reality scene at any one time, and the secondary content window overlays the virtual reality scene at a particular location relative to the virtual reality scene; and wherein display of the at least part of the predefined area of the scene hidden by the secondary content window and secondary visual content is provided overlaying the virtual reality content at a location outside the secondary content window.

Accordingly, in one or more examples, the user input may provide for sliding out of imagery hidden by the secondary content window from beneath the secondary content window for viewing by the user.

In one or more embodiments, based on one or more of further user input and expiry of a predetermined time, the apparatus is caused to provide for removal from display of the at least part of the predefined area of the scene hidden by the secondary content window and secondary visual content.

In one or more examples, the "hidden" content may one or more of disappear, fade away, the secondary content window may slide back over the predefined area of the scene or the displayed predefined area of the scene may slide back underneath the secondary content window.

In one or more embodiments, based on the predetermined event occurring in the scene at the location hidden by the secondary content window; the apparatus is further caused to provide for presentation of a visual indicator graphic.

In one or more examples, the visual indicator graphic is provided for display at an edge of the secondary content window or an edge of the user's current view of the scene or therebetween.

In one or more embodiments, the predetermined event is identified by one or more of;
predetermined data associated with the scene;
visual analysis of the scene to identify one or more visual changes occurring in the predefined area of the scene that is hidden by the secondary content window;
audio analysis of the scene to identify one or more of the occurrence of and change in audio that has a perceived origin in the predefined area of the scene that is hidden by the secondary content window.

In a second example aspect there is provided a method, the method comprising
in respect of presentation, to a user, of a secondary content window overlying a scene such that the secondary content window covers a predefined area of the scene less than an area comprising a visual extent of the scene, the secondary content window providing a display area in which to provide for presentation of at least secondary visual content thereby allowing for viewing of the secondary visual content alongside the scene outside the predefined area;
based on a predetermined event occurring in the scene at a location hidden by the secondary content window;
providing for presentation of audio of at least the predetermined event with an event spatial audio effect, the event spatial audio effect configured to place a perceived origin of the audio of the predetermined event at a location outside the secondary content window to thereby alert a user to the occurrence of the predetermined event hidden by the secondary content window.

In a third example aspect there is provided a computer readable medium comprising computer program code stored thereon, the computer readable medium and computer program code being configured to, when run on at least one processor, perform the method of:
in respect of presentation, to a user, of a secondary content window overlying a scene such that the secondary content window covers a predefined area of the scene less than an area comprising a visual extent of the scene, the secondary content window providing a display area in which to provide for presentation of at least secondary visual content thereby allowing for viewing of the secondary visual content alongside the scene outside the predefined area;

based on a predetermined event occurring in the scene at a location hidden by the secondary content window;

providing for presentation of audio of at least the predetermined event with an event spatial audio effect, the event spatial audio effect configured to place a perceived origin of the audio of the predetermined event at a location outside the secondary content window to thereby alert a user to the occurrence of the predetermined event hidden by the secondary content window.

In a further aspect there is provided an apparatus, the apparatus comprising means configured to; in respect of presentation, to a user, of a secondary content window overlying a scene such that the secondary content window covers a predefined area of the scene less than an area comprising a visual extent of the scene, the secondary content window providing a display area in which to provide for presentation of at least secondary visual content thereby allowing for viewing of the secondary visual content alongside the scene outside the predefined area;

based on a predetermined event occurring in the scene at a location hidden by the secondary content window;

provide for presentation of audio of at least the predetermined event with an event spatial audio effect, the event spatial audio effect configured to place a perceived origin of the audio of the predetermined event at a location outside the secondary content window to thereby alert a user to the occurrence of the predetermined event hidden by the secondary content window.

The present disclosure includes one or more corresponding aspects, examples or features in isolation or in various combinations whether or not specifically stated (including claimed) in that combination or in isolation. Corresponding means and corresponding functional units (e.g., function enabler, point of view determiner, display device, virtual reality displaying apparatus, real-world object tracking element, image recognition and tracking element) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

A user may wish to watch different content at the same time. For example, a user may watch primary content but would want to keep track of secondary content at the same time. They may wish to keep track of the secondary content for any interesting events that may be occurring in the secondary content. Those skilled in the art may be familiar with such an arrangement as functionality of some televisions, which may be known as a picture in picture configuration, in which the primary content is provided for display and, overlaid over a part of the primary content, is a window showing the secondary content.

Virtual reality and augmented reality provide an alternative environment in which the "picture in picture" concept can be applied. For example, in virtual reality, a region or area of the space in which the "primary" virtual reality content is displayed may include a view of different, secondary content. The secondary content may be displayed at a fixed position in virtual reality so that the user knows to look in a particular direction to see the secondary content. Further, in augmented reality the primary content may be the real-world, which could be a real-world play, musical or production or even everyday life. The secondary content may be provided as an augmented graphic overlaid over the user's view of the real-world. Similar to virtual reality, in augmented reality, an augmented reality graphic may provide for viewing of the secondary content which may be displayed at a fixed position in augmented reality so that the user knows to look in a particular direction to see the secondary content. In one or more examples, the secondary content may be displayed at a fixed position relative to the user's current view rather than relative to primary content. As the primary content may be video imagery, computer generated graphics or a view of the real-world or combinations thereof depending on whether the picture in picture configuration is provided by way of conventional video imagery, in virtual reality or in augmented reality, the term "scene" will be used to describe all these types of primary content.

The display of secondary content may result in at least parts of the scene being hidden from view, particularly but not exclusively, if the location at which the secondary content is displayed is fixed relative to the scene.

Virtual reality (VR) may use a VR display comprising a headset, such as glasses or goggles or virtual retinal display, or one or more display screens that surround a user to provide the user with an immersive virtual experience. A virtual reality apparatus, using the VR display, may present multimedia VR content representative of a scene to a user to simulate the user being virtually present within the scene. The virtual reality scene may replicate a real world scene to simulate the user being physically present at a real world location or the virtual reality scene may be computer generated or a combination of computer generated and imaged real world multimedia content. The virtual reality scene may be provided by a panoramic video (such as a panoramic live broadcast or pre-recorded content), comprising a video having a wide or 360° field of view (or more, such as above and/or below a horizontally oriented field of view). The user may be presented with a VR view of the scene and may, such as through movement of the VR display (i.e. headset), move the VR view to look around the scene. Accordingly, a three-dimensional virtual reality space may be provided in which the virtual reality content is displayed and in which the user can look around and, optionally, explore by translation through the VR space.

The VR content provided to the user may comprise live or recorded images of the real world, captured by a VR content capture device, for example. A VR content capture device may be configured to capture VR content for display to one or more users. A VR content capture device may comprise one or more cameras and one or more (e.g. directional and/or ambient) microphones configured to capture the surrounding visual and aural scene from a point of view. An example VR content capture device is a Nokia OZO camera of Nokia Technologies Oy. Thus, a musical performance may be captured (and recorded) using a VR content capture device, which may be placed on stage, with the performers moving around it or from the point of view of an audience member. In each case a consumer of the VR content may be able to look around using the VR display of a VR apparatus to experience the performance at the point of view of the capture location as if they were present.

As the VR scene is typically spatially larger than a portion a user can view with the VR view presented on the VR display at any one time, the VR apparatus may provide for panning around of the VR view in the VR scene based on movement of a user's head or eyes. For example, the field of view in the horizontal plane of a VR display may be about 120° but the VR content may provide 360° video imagery. Thus, the field of view of the VR view provided by the VR display may be less than the total spatial extent of the VR content.

The virtual reality content may be provided with spatial audio having directional properties, such that the audio is perceived to originate from a point in the VR space, which may be linked to the imagery of the VR content. The spatial positioning of the audio may be provided by the degree to which audio is presented to each channel of a multichannel audio arrangement, as well as 3D audio effects, such as those that utilise a head transfer function to create an directional audio space in which audio can be positioned for presentation to a user.

Augmented reality comprises the presentation of graphics and audio overlaid over a view of the real world. Augmented reality may be provided by augmented reality glasses, retina projector or other augmented reality headset for providing a combined view of the real-world and augmented graphics, such as video imagery. The positioning of the augmented graphics may be at a fixed position within the augmented reality view provided to the user, such that no matter where the users looks, the augmented graphic remains in a fixed position relative to the user's view. In one or more examples, positioning of the augmented graphics may be at a fixed position relative to the scene, such that in order to see the augmented reality graphic the user needs to look in the same direction in the scene. Augmented reality, like mentioned for virtual reality above, may also be provided with spatial audio. Thus, the spatial audio may replicate (or modify, in one or more examples) the audio from the real world visible to the user and may introduce additional directional audio, such as based on the secondary content.

The examples described hereinafter will primarily focus on the implementation in virtual reality, although it will be appreciated that the apparatus and methods described herein are equally applicable to augmented reality accompanied by spatial audio.

Figure 1:
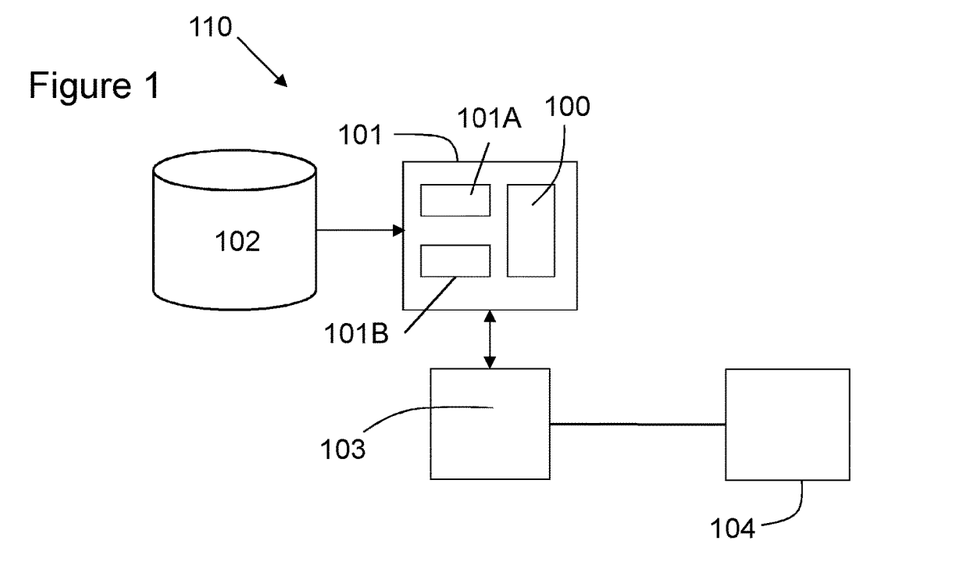
FIG. 1 illustrates an example apparatus.

The apparatus 100 may form part of or be in communication with a VR apparatus 101 for presenting VR content to a user. A store 102 is shown representing the VR content stored in a storage medium or transiently present on a data transmission bus as the VR content is captured and received by the VR apparatus 101. The VR content may be captured by at least one VR content capture device and may be live or recorded. A user may use a VR head set 103 or other VR display to view the VR content. The VR display 103, or more generally the VR apparatus 101, may be associated with headphones 104 or other multi-channel sound generating arrangement for presentation of directional audio (and optionally, in addition, ambient audio which does not have an perceived origin direction).

In this embodiment the apparatus 100 mentioned above may have only one processor 101A and one memory 101B but it will be appreciated that other embodiments may utilise more than one processor and/or more than one memory (e.g. same or different processor/memory types). Further, the apparatus 100 may be an Application Specific Integrated Circuit (ASIC). The apparatus 100 may be separate from and in communication with the VR apparatus 101 or, as in FIG. 1, may be integrated with the VR apparatus 101. In other examples, the apparatus 100 may be integrated with or separate from and in communication with an augmented reality apparatus. The apparatus 100 and VR apparatus 101 may share the processor 101A and/or memory 101B or may be provided with separate processors and/or memories.

The processor 101A may be a general purpose processor dedicated to executing/processing information received from other components, such as the VR apparatus 101 and the apparatus 100, in accordance with instructions stored in the form of computer program code on the memory. The output signaling generated by such operations of the processor is provided onwards to further components, such as to the VR apparatus 101 for display of the required imagery described in more detail below.

The memory 101B (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the processor 101A and the memory 101B are all electrically connected to one another internally to allow for electrical communication between the respective components. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
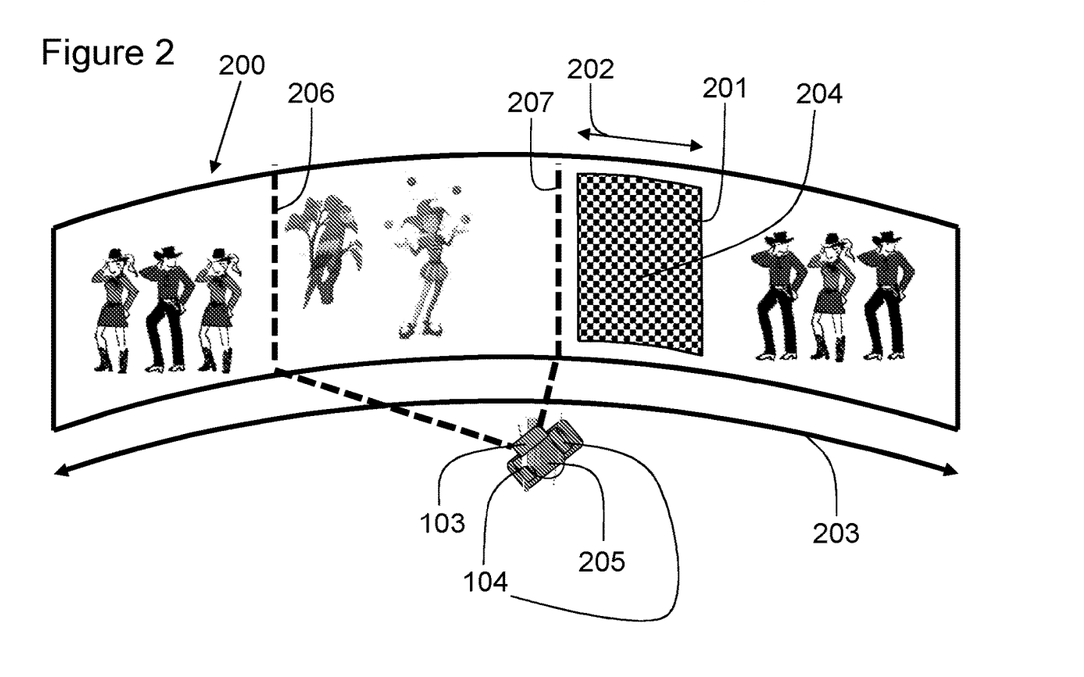
FIG. 2 shows a scene and a virtual reality view provided to the user as well as a secondary content window.
Figure 3:
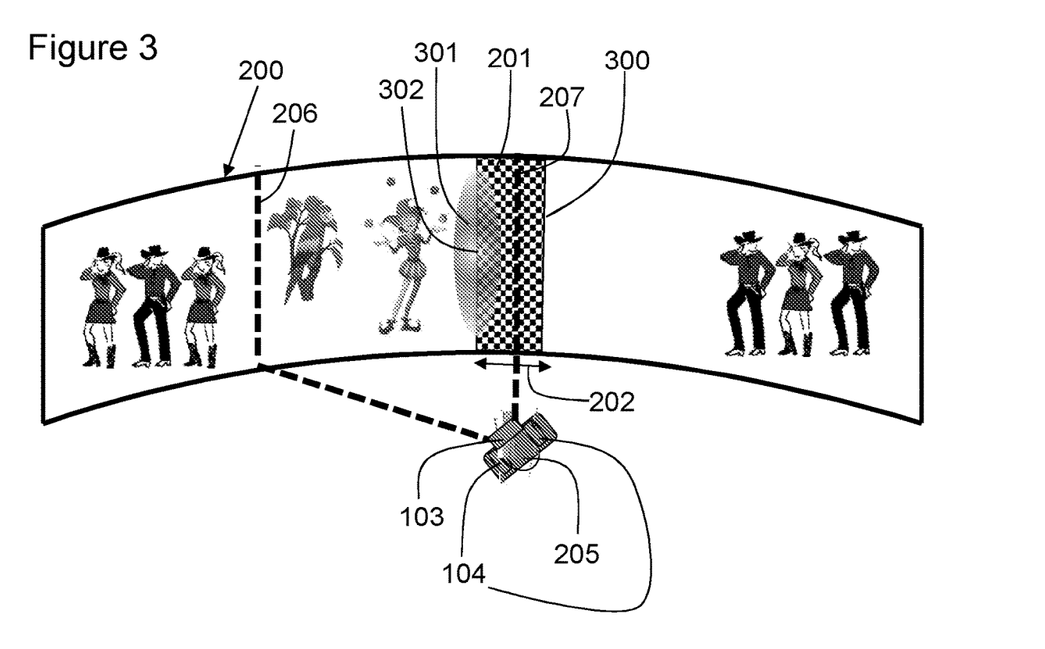
FIG. 3 shows an occurrence of a predetermined event.
Figure 4:
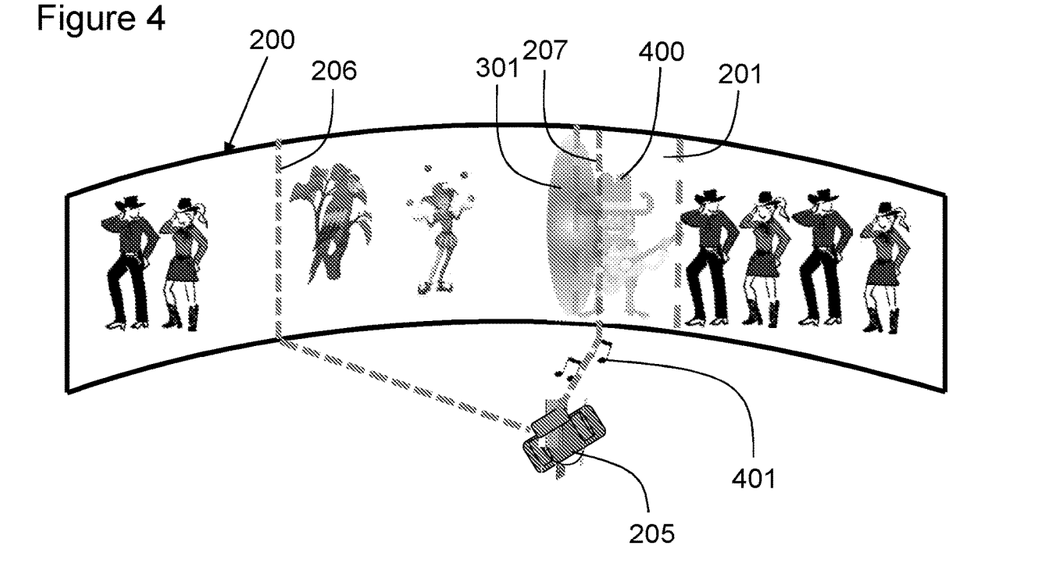
FIG. 4 shows the secondary content window with a visual effect applied thereto.
Figure 5:
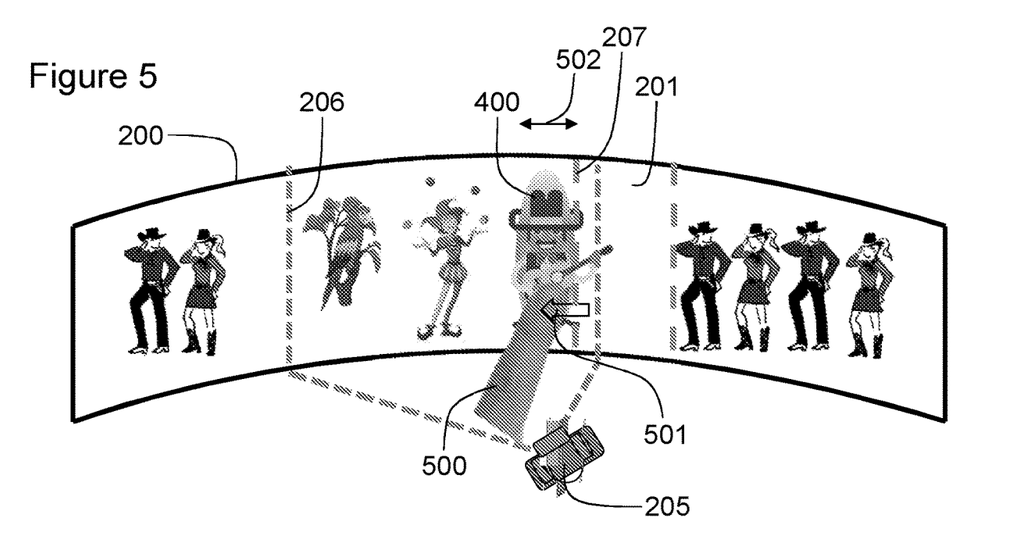
FIG. 5 shows a user input to reveal the part of the scene hidden by the secondary content window.

The apparatus 100 or a different apparatus, such as the VR apparatus 101, may be configured to provide for display of a scene 200 (shown in FIG. 2 and described in more detail below), which may comprise "primary" VR content. Further, the apparatus 100, VR apparatus 101 or a different apparatus may be configured to provide for presentation, to a user, of a secondary content window 201 overlying the scene 200 such that the secondary content window 201 covers a predefined area (illustrated as width 202 for simplicity) of the scene 200. The predefined area is less than an area comprising a visual extent (illustrated as width 203 for simplicity) of the scene 200. It will be appreciated that although widths 202 and 203 are provided to illustrate the area covered by the secondary content window 201, the secondary content window may have dimensions less than the extent of the scene 200 in any direction, width or otherwise. In the example of FIG. 2, the secondary content window 201 may comprise a window, such as a rectangular window or any other shaped window. In one or more examples, the secondary content window may comprises a strip of space, as illustrated in FIGS. 3 to 5. The secondary content window 201 provides a display area in which to provide for presentation of at least secondary visual content 204 (illustrated as a checker-board pattern) thereby allowing for viewing of the secondary visual content inside the window 201 alongside the primary content comprising scene 200 that is outside the predefined area 202. Thus, in one or more examples, a section of a display or the VR/AR space in which imagery is provided for display may be designated for the scene and a different section of the display or VR/AR space may be designated for the secondary content. The secondary visual content may be presented, at least some of the time, with associated secondary audio content in one or more examples.

As shown in FIG. 2, the apparatus 100 or a different apparatus, such as the VR apparatus 101, may thereby provide for display of the primary VR content comprising the scene 200 with the secondary visual content overlaid thereon in the secondary content window 201. The scene 200 shown in the figures is illustrated as a panorama to illustrate the 360° view provided by virtual reality to a user 205. The user 205 is shown wearing the VR display 103 and the headphones 104. Accordingly, the scene 200 may be arranged in a virtual reality space to wrap around the user to provide a 360° view. The user may not be able to view the whole extent of the scene 200 at any one time and may be provided with a virtual reality view (shown by dashed lines 206, 207) that includes a spatial portion of the scene 200. Accordingly, the virtual reality view 206, 207 provided to the user 205 provides for viewing of part of the scene 200 and movement of the user's head (or by other user input) may, by way of the VR apparatus 101, provide for changing of the VR view 206, 207 presented to the user to display a different part of the scene 200 for viewing thereof. The scene 200 may be presented with directional audio and therefore the scene 200 may be considered to be a visual scene that is associated with a corresponding aural scene, wherein the directional audio may be positioned in the aural scene, such as to correspond to the positions of the imagery of the objects generating the audio in the visual scene 200, for example.

In FIG. 2, the scene 200 may comprise primary VR content and the secondary visual content 201 may comprise a spatial portion of second VR content, different to the first VR content. In this example, the secondary content window 201 is displayed in a fixed position relative to the scene 200. In one or more examples, the secondary content window 201 may be displayed at a fixed position relative to the bounds or field of view of the VR view 206, 207. Thus, the secondary content window 201 may be displayed, for example, in a bottom corner or other fixed position of the VR view 206, 207 no matter where the user 205 looks in the scene 200.

While the secondary content window 201 and the secondary visual content provided therein may be helpful to the user 205 for keeping track of occurrences in the secondary visual content, the presence of the secondary content window 201 hides an area 202 of the scene 200 from view. Interesting events occurring in the area 202 hidden by the secondary content window 201 may be missed by the user 205.

In one or more examples, the secondary visual content 204 provided in the secondary content window 201 has associated secondary audio content. The secondary audio content may be provided for audible presentation to the user 205 along with the audio associated with the scene 200. In one or more examples, said secondary audio content comprises directional or spatial audio such that it is perceived to originate from a particular direction. Thus, the secondary content audio may be provided with a secondary spatial audio effect configured to place a perceived origin of the audio of the secondary audio content at a location within aural scene corresponding to the position of the secondary content window 201 in the visual scene 200. Thus, audio associated with the secondary visual content may be heard from the direction of the secondary content window 201.

It will be appreciated that secondary audio content may be presented instead of audio associated with the part of the scene 200 that is hidden by the secondary content window 201. Thus, audio associated with the area 202 covered by the secondary content window 201 may be muted in preference to the secondary audio content. Accordingly, interesting events occurring in the area 202 hidden by the secondary content window 201 may be audibly missed by the user 205 as well as visually missed by the user 205.

FIG. 3 is substantially similar to the arrangement shown in FIG. 2 and the same reference numerals have been used. FIG. 3 differs from FIG. 2 in that the secondary content window 201 is shown as a strip 300 rather than a rectangular window. Further, the VR view 206, 207 happens to include an edge of the secondary content window 201. Thus, the secondary content window 201 is partly in the VR view.

FIG. 3 illustrates the actions of the apparatus 100 upon the occurrence of a predetermined event occurring in the scene 200 at a location hidden by the secondary content window 201. The apparatus 100 may be configured to receive information that a predetermined event has occurred or may be configured to determine the occurrence of a predetermined event based on one or more parameters. For example, the predetermined event may be identified by one or more of: (i) predetermined data associated with the scene 200; (ii) visual analysis of the scene 200 to identify one or more visual changes occurring in the predefined area 202 (shown as a width again) of the scene that is hidden by the secondary content window 201; (iii) audio analysis of the aural scene that comprises part of or accompanies scene 200 to identify one or more of the occurrence of and change in audio that has an origin in the predefined area 202 of the scene 200 that is hidden by the secondary content window 201.

Accordingly, the predetermined data may comprise information generated by the VR content producer or by one or more other users that defines the time and location in the scene of events. The events may comprises characters talking, action sequences, or any other occurrence that may be of interest to a user.

The visual analysis may be performed by the apparatus 100 or another apparatus on request of the apparatus 100 or independently. The visual analysis may automatically identify an event based on visual changes in the predefined area 202 of the scene 201. The visual analysis may be performed during consumption of the VR content or beforehand. The visual analysis may be applied to the VR content comprising the scene 200 or to the real-world captured by cameras should the apparatus 100 be implemented as part of an augmented reality apparatus.

The audio analysis may be performed by the apparatus 100 or another apparatus on request of the apparatus 100 or independently. The audio analysis may automatically identify an event based on directional audio or changes to the audio that occur in the aural scene corresponding to predefined area 202 covered by the secondary content window 201. Thus, audio from that specific direction may be indicative of an event occurring that may be hidden be the secondary content window 201. The audio analysis may be performed during consumption of the VR content or beforehand. The audio analysis may be applied to the VR content comprising the scene 200 or to real-world audio captured by directional microphones should the apparatus 100 be implemented as part of an augmented reality apparatus.

The apparatus 100, based on the occurrence of a "hidden" predetermined event, is configured to provide for presentation of audio of at least the predetermined event with an event spatial audio effect. The predetermined event may be a visual and/or aural occurrence in the predefined area covered by the secondary content window. In a first example, the predetermined event may be the commencement of an exchange of dialogue. Accordingly, the apparatus 100 may provide for presentation of audio of at least the commencement of the dialogue and, additionally, the continuation of that dialogue. In a second example, the predetermined event may be a character briefly tapping on a window, and the apparatus 100 may provide for presentation of the tapping (i.e. the predetermined event) but nothing more.

The event spatial audio effect is configured to place a perceived origin of the audio of the predetermined event at a location outside the secondary content window 201 to thereby alert the user 205 to the occurrence of the predetermined event hidden by the secondary content window 201. This may be advantageous because if the secondary audio content is presented in preference to the scene's directional audio at the location of the secondary content window, the event spatial audio effect can be used to capture the user's attention and alert them, and optionally guide them, to the opportunity to view the predetermined event that is currently hidden by the secondary content window 201. The ability of the event spatial audio effect to position or reposition the perceived origin of the audio at a required location in the aural scene may be advantageous, as will be described further below.

In one or more examples, the event spatial audio effect is configured to place the perceived origin of the audio of at least the predetermined event at a location adjacent to the secondary content window 201. Thus, the presentation of spatial audio in this way may provide the perception that the audio of the predetermined event is "leaking out" from beneath the secondary content window, which may indicate to the user that something interesting may be occurring in the scene 200 that they currently cannot see.

The provision of the event spatial audio effect may, in one or more examples, be accompanied by a visual indicator graphic in response to the occurrence of the predetermined event. FIG. 3 shows an example of the visual indicator graphic 301 positioned at an edge 302 of the secondary content window 201. Further the visual indicator graphic, in this example, appears as a glowing effect at the edge 302 of the secondary content window 201. In one or more examples the visual indicator graphic 301 may be positioned differently. For example, the apparatus 100 may be configured to provide a visual indicator graphic 301 configured to one or more of:

i) extend along at least one edge of the secondary content window 201;
    ii) point towards the secondary content window 201;
    iii) provide for the appearance of glowing of the secondary content window 201;
    iv) be arrow shaped;
    v) be positioned at an edge of the VR view 206, 207 closest to the secondary content window.

For example, if the VR view 206, 207 does not happen to be directed in a direction that includes the secondary content window 201 when the predetermined event occurs, the apparatus 100 may provide for positioning of the visual indicator graphic 301 in the VR view as an arrow or otherwise positioned to inform the user of the direction towards the secondary content window 201 (e.g. the direction that provides the shortest path to the secondary content window and therefore the predetermined event). Based on subsequent movement of the VR view 206, 207 to include the secondary content window 201, the visual indicator graphic 301 may be provided on or adjacent to the secondary content window, such as depicted in the example of FIG. 3.

In one or more examples, the event spatial audio effect is configured to place the perceived origin of the audio of at least the predetermined event at a location between an edge, comprising the edges of the VR view marked by dashed lines 206, 207 of the current field of the view closest to the predetermined event and the predetermined event. Accordingly, particularly when the secondary content window 201 is outside the user's current field of view 206, 207 of the scene 200, the event spatial audio effect is positioned at a side of the user relative to the VR view of the user, the side being closest to the predetermined event.

The audio positioning provided by the event spatial audio effect may be selected based on how the aural scene of the scene 200 is audibly presented. In one or more examples, the aural scene may be presented such that audio from all directions is provided to the user 205. Accordingly the event spatial audio effect may be positioned adjacent to the secondary content window 201. In one or more examples, the aural scene may be presented such that audio from directions within the current field of view of the user, i.e. in the VR view 206, 207, are presented with a bias relative to audio from directions outside the current field of view of the user. Thus, the event spatial audio effect, in situations where the above-mentioned bias is provided, may be configured to position the audio of at least the predetermined event at an edge of the current field of view (i.e. the edge of the VR view, or the edge of a current AR view).

In one or more examples, the apparatus 100 may be caused to provide for configuration of the event spatial audio effect such that the placement of the perceived origin is based on the direction of the current view of the scene 200 relative to the direction towards the predetermined event. In one or more examples, the perceived origin may dynamically move based on the user's current view direction. Thus, for example, when the user is not looking towards the predetermined event, such as away from it, the event spatial audio effect may place the perceived origin of the audio at a location near an edge of the current view 206, 207. In response to the user 205 turning their head towards the predetermined event, the event spatial audio effect may move the perceived origin (progressively or stepwise) towards the predetermined event until the perceived origin coincides with the secondary content window 201. Accordingly, the positioning of the perceived origin may be thought of as leading or guiding the user towards the predetermined event similar to a visual cue. In one or more examples, the visual indicator graphic 301 may follow the position of the perceived origin or vice versa.

The provision of audio of at least the predetermined event with the event spatial audio effect may, in one or more examples, be provided to capture the attention of the user so that they have the opportunity to view the predetermined event. However, in some circumstances the user may not wish to view the predetermined event and the provision of the audio thereof with the event spatial audio effect may be an annoyance. Accordingly, the apparatus 100 may be caused to provide for presentation of the audio of at least the predetermined event for a time period temporally extending from the predetermined event to one or more of:

- a predetermined period of time thereafter;
- a time defined by a user input to stop the presentation of said audio;
- a time defined by predetermined data associated with the scene;
- a time determined by visual analysis of the scene to identify when one or more visual changes occurring in the predefined area of the scene that is hidden by the secondary content window, the one or more visual changes defining the predetermined event, have ended;
- a time determined by audio analysis of the scene to identify when one or more of an occurrence of and change in audio that has a perceived origin in the predefined area of the scene that is hidden by the secondary content window, the occurrence of/change in audio defining the predetermined event, has ended.

Thus, in one or more examples, the apparatus 100 may provide for audible presentation of the audio for a fixed, predetermined period of time or until the user 205 requests it to stop by way of a user input, such as a gesture or voice command, among other types of user input. In one or more examples, the temporal extent of the predetermined event may be defined by predetermined data associated with the scene 200 and therefore the apparatus 100 may start and/or stop the presentation of said audio of the predetermined event in accordance with the timings provided in the predetermined data. In one or more examples, visual or audio analysis may be used to identify the start and/or end of a predetermined event and the results of said analysis may provide information for the apparatus 100 to start and/or stop the presentation of said audio of the predetermined event.

Turning to FIG. 4, the secondary visual content is shown without the checker-board pattern in order to illustrate the apparatus 100 providing for display of the secondary visual content with a visual effect to provide for viewing of the predefined area of the scene previously hidden by the secondary content window and secondary content. Thus, based on the occurrence of the predetermined event, the apparatus 100 may be caused to provide for display of the scene 200 hidden by the secondary content window and the secondary visual content that is displayed therein. The visual effect may provide for temporary transparency of the secondary content window 201, as shown in FIG. 3. In one or more examples, the visual effect may provide for temporarily exposing of the scene 200 covered by the secondary content window 201. Thus, the secondary content window may be intermittently removed from display to reveal the predefined area of the scene 200 beneath. Accordingly the visual effect may be considered to be animated in that it changes over time between having no effect on transparency to having an effect on transparency. In one or more examples, the visual effect may comprise an animated effect to show the part of the scene 200 hidden by the secondary content window 201 at least partly translated from behind the secondary content window 201. Accordingly, the visual effect may provide for visual imagery of the scene 200 to be shown to "peek out" from behind the secondary content window 201 or the secondary content window may be shown to slide to one side to reveal the covered part of the scene 200.

In FIG. 4, it can be seen that beneath the secondary content window 201 is a guitar playing cowboy 400. Accordingly, in this example, the predetermined event was the commencement of the playing of the guitar by the cowboy 400 in the area of the scene 200 covered by the secondary content window 201. Further, the audio of at least the predetermined event which is provided for audible presentation with the event spatial audio effect is, in this example, the audio of the guitar playing. Notes 401 illustrate the perceived origin of the audio of the predetermined event as provided for by the event spatial audio effect. The application of the visual effect to the secondary visual content and, optionally, the secondary content window itself, may be accompanied by the apparatus 100 providing for audible presentation of the audio of at least the predetermined event without the spatial audio effect (at least at times where the underlying scene is visible due to the visual effect) such that the audio is heard from its genuine location in the scene 200.

FIG. 5 shows the apparatus 100 providing for viewing of the part of the scene 200 hidden by the secondary content window 201, such as in response to received user input. FIG. 5 shows the user performing a gesture, comprising the user input, with their finger 500 to move the cowboy 400 i.e. the part of the scene 200 that was hidden, out from behind the secondary content window 201. The gesture may comprise the user pointing towards the cowboy 400 and sliding their finger 500 shown by arrow 501 to draw out the cowboy 400. It will be appreciated that other gestures and other forms of user-input may be used. Thus, in one or more examples, based on the user input 501 to reveal the predetermined event 400, the apparatus 100 is caused to provide for display of at least part of the predefined area of the scene 200 hidden by the secondary content window 201 and secondary content 204. The display of the predefined area of the scene 200 hidden by the secondary content window 201 and secondary content 204 may be temporary and the apparatus 100 may automatically return the predefined area of the scene 200 to its hidden state when conditions are met.

The provision for display of at least part of the predefined area of the scene 200 hidden by the secondary content window 201 may be achieved by providing for movement of the secondary content window 201 relative to the scene 200 and/or providing for display of at least part of the predefined area of the scene 200 at a location outside the secondary content window. Thus, in one or more examples, the apparatus 100 may provide for repositioning of the secondary content window 201. This may be similarly achieved when implemented in augmented reality as well as virtual reality. In one or more other examples, the predefined area 202 of the scene 200 hidden by the window 201 may be considered as a layer that can be overlaid over a different area (illustrated as width 502) of the scene 200 that is not covered by the secondary content window 201. When implemented in virtual reality, the hidden imagery of the scene 200 may be cropped from the scene 200 and overlaid at another location in the scene 200. When implemented in augmented reality, a camera may be used to capture the area of the scene covered by the secondary content window 201 so that the predefined area can be shown as an augmented reality graphic overlying a different part of the scene 200. In one or more examples, the apparatus 100 may provide for removing from display of the secondary content window 201.

The movement of the secondary content window 201 relative to the scene 200 and/or providing for display of at least part of the predefined area of the scene 200 at a location outside the secondary content window may be temporary, as mentioned above. The apparatus 100 may be configured to provide for said temporary display based on one or more of:
- a predetermined period of time such that predefined area of the scene returns to it hidden state on expiry of the predetermined period of time;
- a user input to return the predefined area to its hidden state;
- a time defined by predetermined data associated with the scene, wherein the predetermined data may define the start and end points of the predetermined event;
- a time based on visual analysis of the scene to identify when one or more visual changes occurring in the predefined area of the scene that is hidden by the secondary content window, the one or more visual changes defining the predetermined event, have ended such that the visual analysis defines the end of the predetermined event;
- a time based on audio analysis of the scene to identify when one or more of an occurrence of and change in audio that has a perceived origin in the predefined area of the scene that is hidden by the secondary content window, the occurrence of/change in audio defining the predetermined event, has ended such that the audio analysis defines the end of the predetermined event.

On expiry of the temporary period the "hidden" content that is temporarily shown may one or more of disappear, fade away or slide back underneath the overlaid secondary content window.

The apparatus 100 may provide for revealing of the predetermined event provided the user input 501 is received within a predetermined time. The predetermined time may comprise one or more of:
- a fixed, predetermined period of time or a time based on the duration of the predetermined event;
- a time defined by predetermined data associated with the scene;
- a time based on visual analysis of the scene to identify when one or more visual changes occurring in the predefined area of the scene that is hidden by the secondary content window, the one or more visual changes defining the predetermined event, have ended;
- a time based on audio analysis of the scene to identify when one or more of an occurrence of and change in audio that has a perceived origin in the predefined area of the scene that is hidden by the secondary content window, the occurrence of/change in audio defining the predetermined event, has ended.

Figure 6:
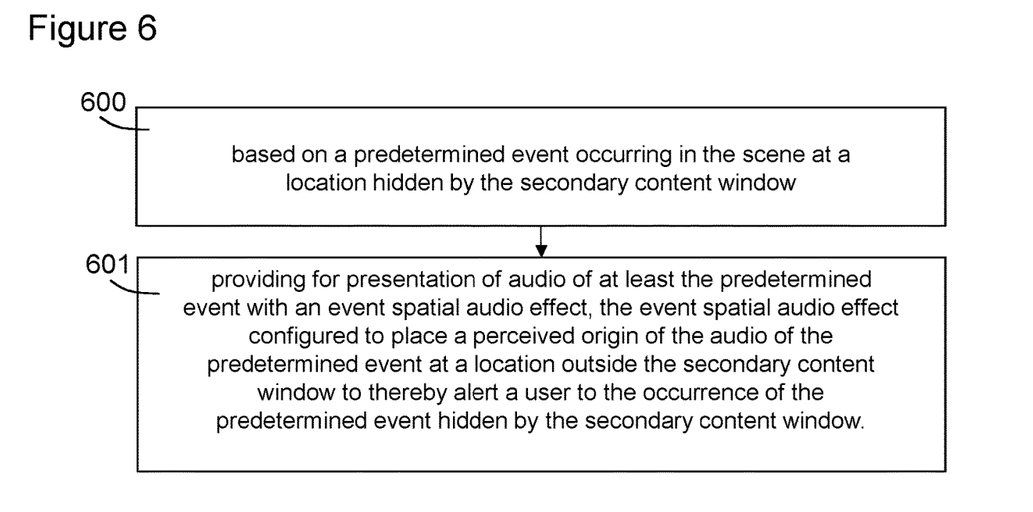
FIG. 6 shows a flowchart illustrating an example method.

FIG. 6 shows a flow diagram illustrating the steps of, in respect of presentation, to a user, of a secondary content window overlying a scene such that the secondary content window covers a predefined area of the scene less than an area comprising a visual extent of the scene, the secondary content window providing a display area in which to provide for presentation of at least secondary visual content thereby allowing for viewing of the secondary visual content alongside the scene outside the predefined area, based on 600 a predetermined event occurring in the scene at a location hidden by the secondary content window; providing for presentation of audio 601 of at least the predetermined event with an event spatial audio effect, the event spatial audio effect configured to place a perceived origin of the audio of the predetermined event at a location outside the secondary content window to thereby alert a user to the occurrence of the predetermined event hidden by the secondary content window.

Figure 7:
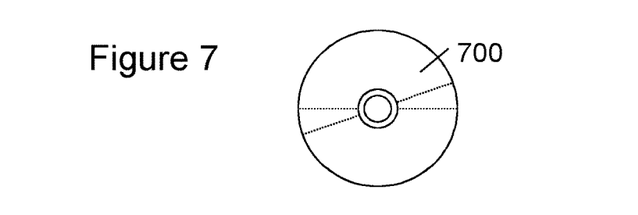
FIG. 7 shows a computer readable medium.

FIG. 7 illustrates schematically a computer/processor readable medium 700 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, hands, or a stylus or other element suitable for performing free space user gestures. User inputs may also comprise voice or textual commands.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a household appliance, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signaling" may refer to one or more signals transmitted as a series of transmitted and/or received electrical/optical signals. The series of signals may comprise one, two, three, four or even more individual signal components or distinct signals to make up said signaling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one non-transitory memory including computer program code, the at least one memory and the computer program code configured to, with the at least one processor, cause the apparatus to perform at least the following:
   in respect of presentation, to a user, of a secondary content window overlying a scene such that the secondary content window covers a predefined area of the scene less than an area comprising a visual extent of the scene, the secondary content window providing a display area in which to provide for presentation of at least secondary visual content thereby allowing for viewing of the secondary visual content alongside the scene outside the predefined area,
   based on a predetermined event occurring in the scene at a location hidden with the secondary content window,
   provide for presentation of audio of at least the predetermined event with an event spatial audio effect, the event spatial audio effect configured to place a perceived origin of the audio of the predetermined event at a location outside the secondary content window to thereby alert the user to the occurrence of the predetermined event hidden with the secondary content window.

2. An apparatus according to claim 1, wherein the scene comprises one of:
   a virtual reality scene based on virtual reality content for presentation to the user in virtual reality, wherein a virtual reality view presented to the user provides for viewing of at least a spatial portion of the virtual reality scene at any one time, and the secondary content window overlays the virtual reality scene at a particular location relative to the virtual reality scene; or
   a real world scene and wherein presentation of the secondary content window is in augmented reality and the secondary content window overlays the real world scene at a particular location relative to the real world scene.

3. An apparatus according to claim 1, wherein the secondary visual content provided in the secondary content window has associated secondary audio content, said secondary audio content provided with a secondary spatial audio effect configured to place a perceived origin of audio of the secondary audio content at a location within the secondary content window;
   and wherein the secondary audio content is presented instead of audio associated with a part of the scene that is hidden with the secondary content window.

4. An apparatus according to claim 1, wherein the event spatial audio effect is configured to place the perceived origin of the audio of at least the predetermined event at a location adjacent to the secondary content window.

5. An apparatus according to claim 1, wherein the secondary content window is provided for display at a particular location relative to the scene, and wherein when the secondary content window is outside the user's current field of view of the scene, the at least one memory and the computer program code are further configured to, with the at least one processor, cause the apparatus to perform:
   provide for presentation of the audio of at least the predetermined event with the event spatial audio effect configured to place the perceived origin at a location between an edge of the current field of view closest to the predetermined event and the predetermined event.

6. An apparatus according to claim 1, wherein the at least one memory and the computer program code are further configured to, with the at least one processor, cause the apparatus to provide for presentation of the audio of at least the predetermined event for a time period temporally extending from the predetermined event to one or more of:
   a predetermined period of time thereafter;
   a time defined with a user input to stop the presentation of said audio;

a time defined with predetermined data associated with the scene;

a time determined using visual analysis of the scene to identify when one or more visual changes occurring in the predefined area of the scene that is hidden with the secondary content window, the one or more visual changes defining the predetermined event, have ended; or a time determined using audio analysis of the scene to identify when one or more of:

an occurrence of audio that has a perceived origin in the predefined area of the scene that is hidden with the secondary content window has ended, or a change in audio that has a perceived origin in the predefined area of the scene that is hidden with the secondary content window has ended, wherein the occurrence of the audio or the change in the audio define the predetermined event.

7. An apparatus according to claim 1, wherein, based on the predetermined event occurring in the scene, the at least one memory and the computer program code are configured to, with the at least one processor, further cause the apparatus to provide for display of the secondary content with a visual effect to provide for viewing of the predefined area of the scene previously hidden with the secondary content window and the secondary content.

8. An apparatus according to claim 1, wherein, based on a user input to reveal the predetermined event, the at least one memory and the computer program code are configured to, with the at least one processor, cause the apparatus to provide for display of at least part of the predefined area of the scene hidden with the secondary content window and the secondary content.

9. An apparatus according to claim 8, wherein display of the at least part of the predefined area of the scene hidden with the secondary content window and the secondary visual content is provided using temporary relocation of the secondary content window to reveal said at least part of the predefined area.

10. An apparatus according to claim 8, wherein the scene comprises a virtual reality scene based on virtual reality content for presentation to the user in virtual reality, wherein a virtual reality view presented to the user provides for viewing of at least a spatial portion of the virtual reality scene at any one time, and the secondary content window overlays the virtual reality scene at a particular location relative to the virtual reality scene; and wherein display of the at least part of the predefined area of the scene hidden with the secondary content window and the secondary visual content is provided overlaying the virtual reality content at a location outside the secondary content window.

11. An apparatus according to claim 10, wherein, based on one or more of further user input and expiry of a predetermined time, the at least one memory and the computer program code are configured to, with the at least one processor, cause the apparatus to provide for removal from display of the at least part of the predefined area of the scene hidden with the secondary content window and the secondary visual content.

12. An apparatus according to claim 1, wherein, based on the predetermined event occurring in the scene at the location hidden with the secondary content window, the at least one memory and the computer program code are configured to, with the at least one processor, further cause the apparatus to provide for presentation of a visual indicator graphic.

13. An apparatus according to claim 1, wherein the predetermined event is identified with one or more of:

predetermined data associated with the scene;

visual analysis of the scene to identify one or more visual changes occurring in the predefined area of the scene that is hidden with the secondary content window;

audio analysis of the scene to identify one or more of:

an occurrence of audio that has a perceived origin in the predefined area of the scene that is hidden with the secondary content window, or a change in audio that has a perceived origin in the predefined area of the scene that is hidden with the secondary content window.

14. A method, comprising:

in respect of presentation, to a user, of a secondary content window overlying a scene such that the secondary content window covers a predefined area of the scene less than an area comprising a visual extent of the scene, the secondary content window providing a display area in which to provide for presentation of at least secondary visual content thereby allowing for viewing of the secondary visual content alongside the scene outside the predefined area, based on a predetermined event occurring in the scene at a location hidden with the secondary content window, providing for presentation of audio of at least the predetermined event with an event spatial audio effect, the event spatial audio effect configured to place a perceived origin of the audio of the predetermined event at a location outside the secondary content window to thereby alert the user to the occurrence of the predetermined event hidden with the secondary content window.

15. A method according to claim 14, wherein the scene comprises one of:

a virtual reality scene based on virtual reality content for presentation to the user in virtual reality, wherein a virtual reality view presented to the user provides for viewing of at least a spatial portion of the virtual reality scene at any one time, and the secondary content window overlays the virtual reality scene at a particular location relative to the virtual reality scene; or a real world scene and wherein presentation of the secondary content window is in augmented reality and the secondary content window overlays the real world scene at a particular location relative to the real world scene.

16. A method according to claim 14, wherein the secondary visual content provided in the secondary content window has associated secondary audio content, said secondary audio content provided with a secondary spatial audio effect configured to place a perceived origin of audio of the secondary audio content at a location within the secondary content window;

and wherein the secondary audio content is presented instead of audio associated with a part of the scene that is hidden with the secondary content window.

17. A method according to claim 14, wherein the event spatial audio effect is configured to place the perceived origin of the audio of at least the predetermined event at a location adjacent to the secondary content window.

18. A method according to claim 14, wherein the secondary content window is provided for display at a particular location relative to the scene, and wherein when the secondary content window is outside the user's current field of view of the scene, providing for presentation of the audio of at least the predetermined event with the event spatial audio effect configured to place the perceived origin at a location between an edge of the current field of view closest to the predetermined event and the predetermined event.

19. A method according to claim 14, further comprising providing for presentation of the audio of at least the predetermined event for a time period temporally extending from the predetermined event to one or more of:
   a predetermined period of time thereafter;
   a time defined with a user input to stop the presentation of said audio;
   a time defined with predetermined data associated with the scene;
   a time determined using visual analysis of the scene to identify when one or more visual changes occurring in the predefined area of the scene that is hidden with the secondary content window, the one or more visual changes defining the predetermined event, have ended; or
   a time determined using audio analysis of the scene to identify when one or more of:
      an occurrence of audio that has a perceived origin in the predefined area of the scene that is hidden with the secondary content window has ended, or
      a change in audio that has a perceived origin in the predefined area of the scene that is hidden with the secondary content window has ended,
   wherein the occurrence of the audio or the change in the audio define the predetermined event.

20. A non-transitory computer readable medium comprising program instructions stored thereon for performing at least the following:
   in respect of presentation, to a user, of a secondary content window overlying a scene such that the secondary content window covers a predefined area of the scene less than an area comprising a visual extent of the scene, the secondary content window providing a display area in which to provide for presentation of at least secondary visual content thereby allowing for viewing of the secondary visual content alongside the scene outside the predefined area,
   based on a predetermined event occurring in the scene at a location hidden with the secondary content window,
   providing for presentation of audio of at least the predetermined event with an event spatial audio effect, the event spatial audio effect configured to place a perceived origin of the audio of the predetermined event at a location outside the secondary content window to thereby alert the user to the occurrence of the predetermined event hidden with the secondary content window.

* * * * *